US012738683B2

(12) United States Patent
Turner et al.

(10) Patent No.: US 12,738,683 B2
(45) Date of Patent: Sep. 15, 2026

(54) CONNECTOR ASSEMBLY AND RELATED METHODS

(71) Applicant: Aptiv Technologies AG, Schaffhausen (CH)

(72) Inventors: Kevin Turner, Vienna, OH (US); Rangarajan Sundarakrishnamachari, Royapettah (IN); Abhaya Kishore, Nagercoil (IN)

(73) Assignee: Aptiv Technologies AG, Schaffhausen (CH)

( * ) Notice: Subject to any disclaimer, the term of this patent is extended or adjusted under 35 U.S.C. 154(b) by 366 days.

(21) Appl. No.: 18/442,256

(22) Filed: Feb. 15, 2024

(65) Prior Publication Data

US 2025/0266635 A1 Aug. 21, 2025

(51) Int. Cl.
*H01R 13/424* (2006.01)
*H01R 43/20* (2006.01)

(52) U.S. Cl.
CPC ........... *H01R 13/424* (2013.01); *H01R 43/20* (2013.01)

(58) Field of Classification Search
CPC .............................. H01R 13/424; H01R 43/20
USPC .......................................................... 439/752
See application file for complete search history.

(56) References Cited

U.S. PATENT DOCUMENTS 6,179,671 B1 * 1/2001 Ohsumi ............. H01R 13/4364 439/752
6,315,601 B1 * 11/2001 Sasaki ................ H01R 13/4361 439/752
7,059,902 B2 * 6/2006 Nakamura ........... H01R 13/641 439/752
7,108,542 B2 * 9/2006 Ishiwa ................. H01R 13/641 439/352
8,336,196 B2 * 12/2012 Goto ...................... H01R 43/20 29/736
8,708,739 B2 * 4/2014 Takeda ............... H01R 13/4223 439/752
9,147,958 B2 9/2015 Kuroda
9,153,894 B2 10/2015 Gerwatowski
9,666,972 B2 5/2017 Martin (Continued)

FOREIGN PATENT DOCUMENTS

CN 101414714 B 4/2009

OTHER PUBLICATIONS

Extended European Search Report for EP24207389.8 dated Mar. 31, 2025, 11 pages.

*Primary Examiner* — Gary F Paumen
(74) *Attorney, Agent, or Firm* — Miller Johnson

(57) ABSTRACT

A connector assembly includes a connector body, a lock member, and an inner housing. The connector body includes a plurality of walls and an inner portion. The plurality of walls define a cavity configured to receive a terminal. The inner portion is disposed within the cavity. The lock member is removably-disposed within the cavity and defines an aperture configured to receive the terminal. The inner housing is removably-disposed within the cavity and defines a slot configured to receive the terminal. The inner housing includes a detent configured to engage the lock member. During actuation of the lock member from a first position to a second position, the detent engages the lock member and moves the lock member toward the inner portion and the terminal to detect whether the terminal is properly disposed within the connector body.

20 Claims, 6 Drawing Sheets

(56) References Cited

U.S. PATENT DOCUMENTS

| | | | | |
|---|---|---|---|---|
| 10,897,103 | B1 | 1/2021 | Sundarakrishnamachari | |
| 11,626,683 | B2 * | 4/2023 | Miyamura | H01R 13/432<br>439/752 |
| 2007/0004288 | A1 * | 1/2007 | Fukatsu | H01R 13/62916<br>439/752 |

* cited by examiner

CONNECTOR ASSEMBLY AND RELATED METHODS

FIELD

The present disclosure relates to a connector assembly and more particularly to a connector assembly having a connector configured to detect an unseated terminal.

BACKGROUND

Modern vehicles (e.g., automobiles) rely on electrical wiring and electrical connections to facilitate communication between various electronic components within the vehicle. Connection systems (e.g., connectors and terminals) play an important role in ensuring the integrity of these electrical connections and in the reliability and performance of the vehicle. Conventional connection systems typically include a housing and one or more terminals designed to make contact and establish electrical pathways with terminals located in a mating connector housing.

Ensuring the secure engagement and retention of terminals within the connector housing, and the secure engagement and retention between components (e.g., seals, terminal and connector position assurance pieces, etc.) within and/or between the connector housings, is crucial for maintaining a reliable electrical connection. Some connection systems utilize mechanisms such as locking clips, levers, or additional components designed to engage terminals and/or components within the connector housing. These solutions often require precise tolerancing, and/or present assembly challenges related to the connector design, to ensure that all of the components of the connection system are properly assembled.

In view of the foregoing, while known mechanisms for securing terminals and/or components within the connector housing have proven acceptable for their intended purpose, a continuous need for improvement remains in the pertinent art to address the challenges associated with connection system assembly.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

One aspect of the disclosure provides a connector assembly. The connector assembly includes a connector body, a lock member, and an inner housing. The connector body includes a plurality of walls and an inner portion. The plurality of walls define a cavity configured to receive a terminal. The inner portion is disposed within the cavity. The lock member is removably-disposed within the cavity and defines an aperture configured to receive the terminal. The inner housing is removably-disposed within the cavity and defines a slot configured to receive the terminal. The inner housing includes a detent configured to engage the lock member. During actuation of the lock member from a first position to a second position, the detent engages the lock member and moves the lock member toward the inner portion and the terminal to detect whether the terminal is properly disposed within the connector body.

Another aspect of the disclosure provides a connector assembly. The connector assembly includes a connector body, a lock member, and an inner housing. The connector body includes a plurality of walls and an inner portion having a locking arm. The plurality of walls define a cavity configured to receive a terminal. The inner portion is disposed within the cavity. The lock member is removably-disposed within the cavity and defines an aperture configured to receive the terminal. The inner housing is removably-disposed within the cavity and defines a slot configured to receive the terminal. The inner housing includes a detent configured to engage the lock member. During actuation of the lock member from a first position to a second position, the detent engages the lock member and moves the lock member toward the inner portion and the terminal to detect whether the terminal is secured by the locking arm.

Yet another aspect of the disclosure provides a method of assembling a connector assembly. The method includes disposing a lock member in a cavity of a connector body. The method includes disposing an inner housing in the cavity. The method includes disposing a terminal in a slot of the inner housing, an aperture of the lock member, and a hole of an inner portion of the connector body. The method includes actuating the lock member from a first position to a second position by engaging a detent of the inner housing with the lock member and moving the lock member toward the inner portion and the terminal to detect whether the terminal is properly disposed within the connector body. The method includes, in accordance with the terminal not being properly disposed within the connector body, moving the terminal to a proper position by moving the lock member via the detent of the inner housing.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Introduction

One aspect of the disclosure provides a system and method for detecting a location of a terminal relative to a connector housing. In particular, an inner connector body may include a detent that engages an independent secondary lock (ISL) to ensure a location of the ISL relative to an outer connector body and, thereby, ensure a location of a terminal relative to the outer connector body. In particular, the detent may be located in a cavity of the inner connector body, and the ISL may be disposed within the cavity, such that, during actuation of the ISL from a first position to a second position, the detent engages the ISL and pushes the ISL toward an inner wall of the outer connector body and toward the terminal. The movement of the ISL toward the inner wall of the outer connector body during actuation can detect a terminal that is not properly disposed (e.g., unseated) within the outer connector body.

Figure 1:
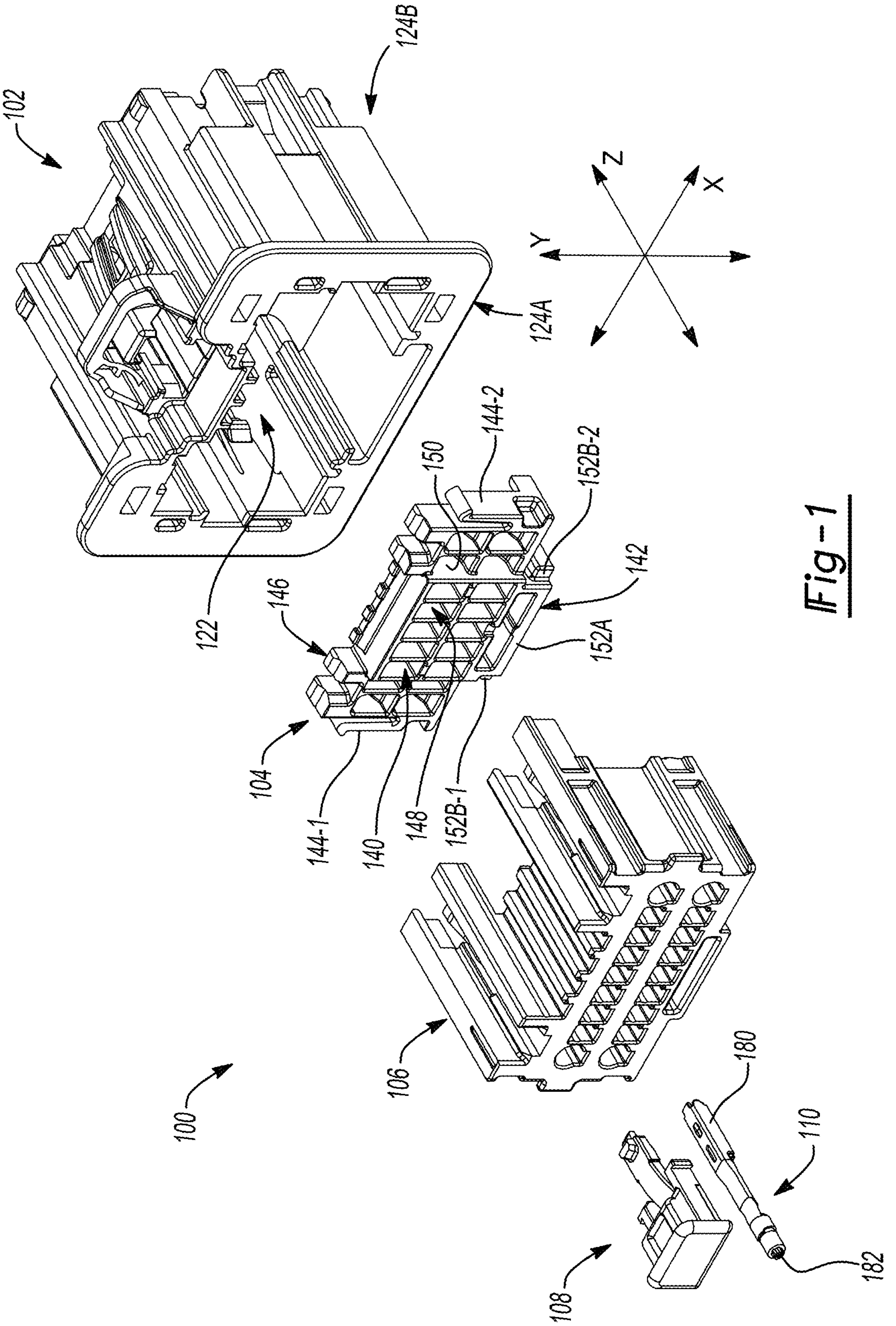
FIG. 1 is a rear exploded view of a connector assembly in accordance with the principles of the present disclosure.
Figure 2:
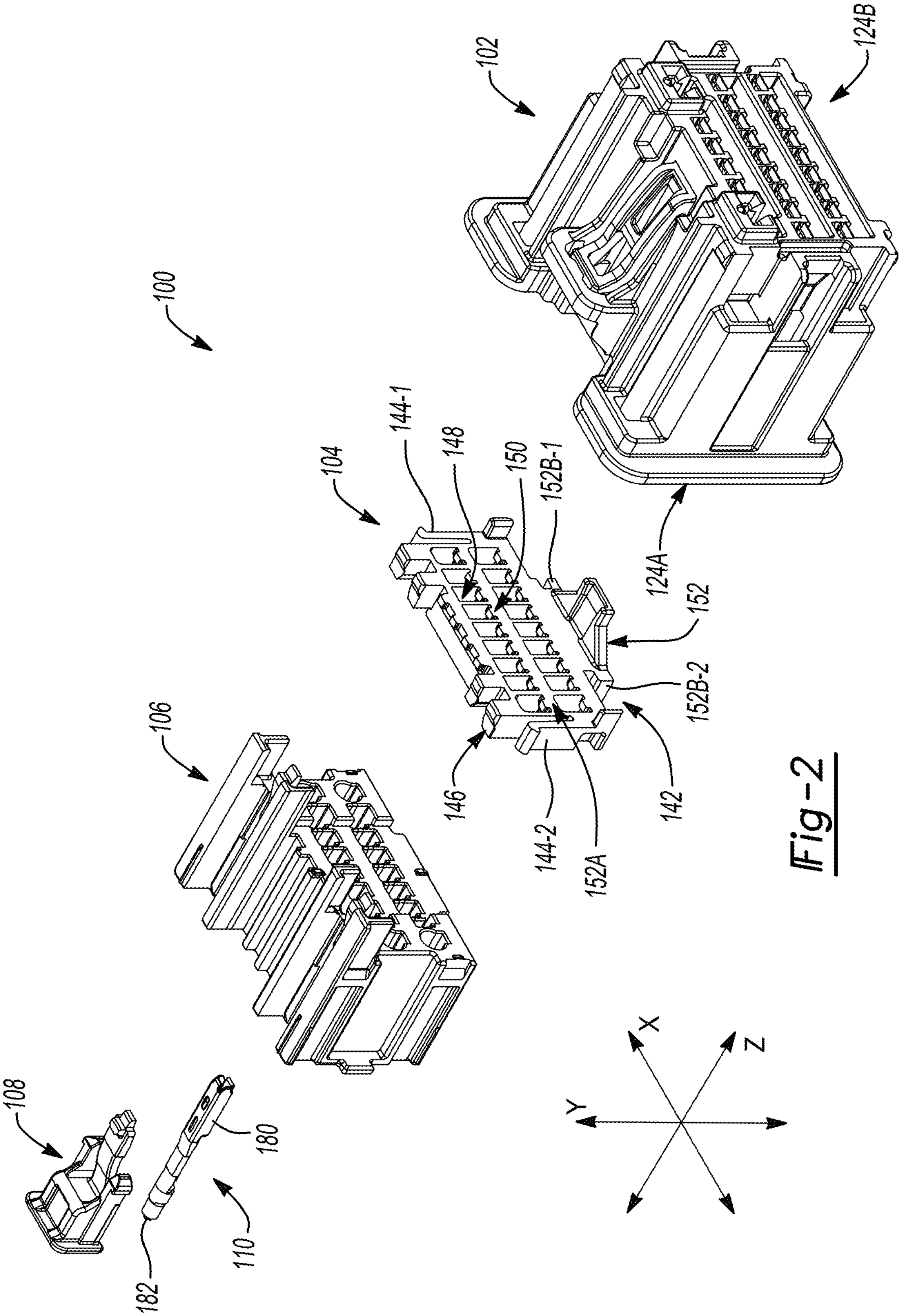
FIG. 2 is a front exploded view of the connector assembly of FIG. 1.

With reference to FIGS. 1 and 2, an example connector assembly 100 is shown. As will be explained in more detail below, the connector assembly 100 may be installed in a vehicle (e.g., an automobile) to facilitate the transmission of electricity between various electronic components within the vehicle. For example, the connector assembly 100 may be a female connector detachably coupled to a mating connector (e.g., a male connector, not shown) such that, during operation, of the vehicle, electricity is transmitted between the connector assemblies and to various electronic components within the vehicle.

In various implementations, the connector assembly 100 includes a connector body 102, a lock member 104, an inner housing 106, a connector position assurance (CPA) device 108, and/or one or more terminal assemblies 110, among others. The connector body 102 includes a plurality of walls 120 that define a cavity 122. The lock member 104 and the inner housing 106 are removably-disposed in the cavity 122. The CPA device 108 may be removably-coupled to the connector body 102 to maintain connection between the connector assembly 100 and a corresponding mating connector assembly (not shown).

Connector Body

Figure 3:
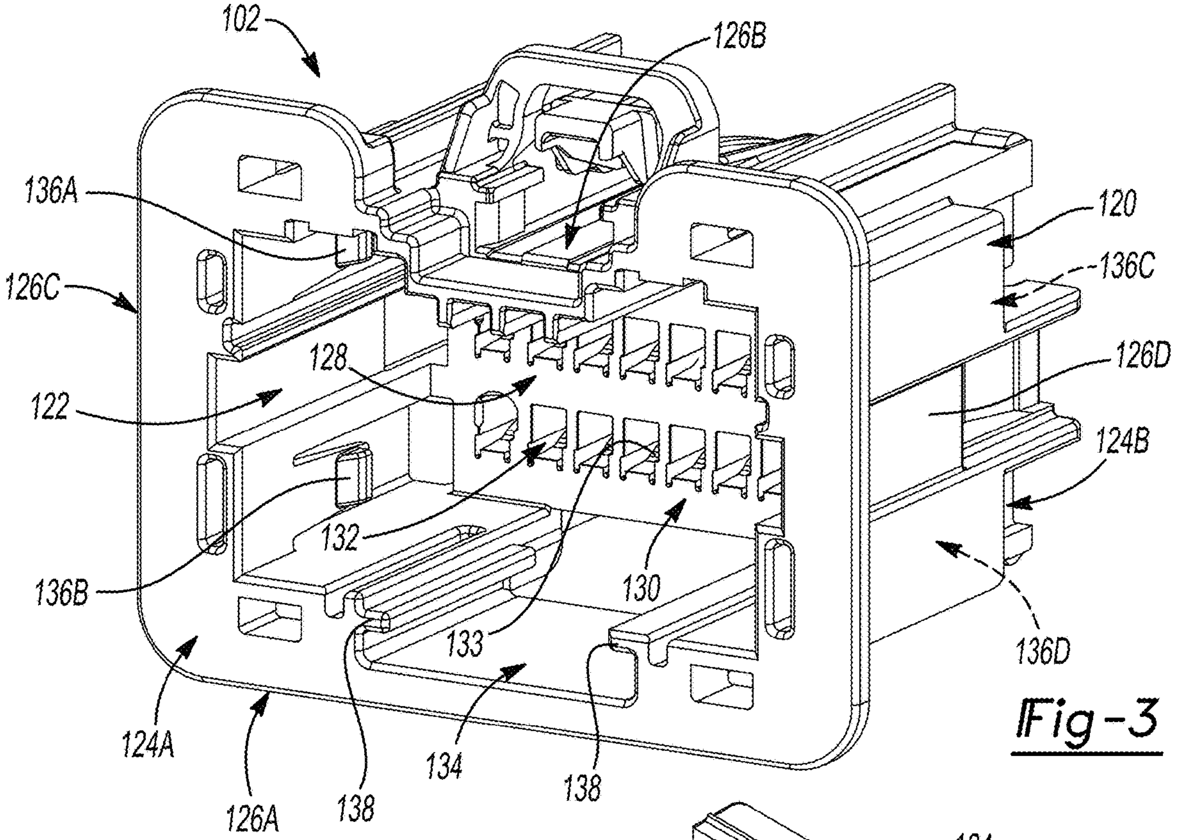
FIG. 3 is a perspective view of a connector body of a connector assembly in accordance with the principles of the present disclosure.

With reference to FIG. 3, an example connector body 102 is shown. In various implementations, the connector body 102 may include a first end 124A, a second end 124B, a first sidewall 126A, a second sidewall 126B, a third sidewall 126C, a fourth sidewall 126D, and an inner portion 128, among others. The second end 124B may be spaced apart from (e.g., opposite) the first end 124A. The first sidewall 126A may be disposed between the first end 124A and the second end 124B. The second sidewall 126B may be spaced apart from (e.g., opposite) the first sidewall 126A. The third sidewall 126C may be disposed between the first sidewall 126A and the second sidewall 126B. The fourth sidewall 126D may be spaced apart from (e.g., opposite) the third sidewall 126C.

In various implementations, the first sidewall 126A, the second sidewall 126B, the third sidewall 126C, and the fourth sidewall 126D define the cavity 122. The cavity 122 may be accessible via the first end 124A and/or the second end 124B of the connector body 102. The cavity 122 receives the lock member 104, the inner housing 106, and/or the terminal assemblies 110, among others.

In various implementations, the inner portion 128 is disposed within the cavity 122. The inner portion 128 may be coupled to (e.g., integrally formed with) the first sidewall 126A, the second sidewall 126B, the third sidewall 124C, and/or the fourth sidewall 124D. The inner portion 128 may include a wall 130 defining a plurality of holes 132 (i.e., apertures) that receive portions of the terminal assemblies 110 (e.g., terminals) and a plurality of locking arms 133. In some example configurations, each locking arm 133 may be disposed in a respective hole 132 and include an end 135 (see e.g., FIGS. 7 and 8). When the terminal assemblies 110 are properly disposed within the holes 132, the locking arms 133 (e.g., the end 135) may inhibit removal of the terminals from the cavity 122 (e.g., the holes 132). The inner portion 128 may facilitate the connection and/or alignment of the terminal assemblies 110 with corresponding terminal assemblies of the mating connector (not shown).

In various implementations, the first sidewall 126A of the connector body 102 may define at least one channel 134. The channel 134 may receive portions of the lock member 104 and the inner housing 106. The channel 134 may be accessible via the first end 124A of the connector body 102.

In various implementations, the connector body 102 may include a plurality of locking features (i.e., locking arms and/or tabs, etc.), such as a first locking feature 136A, a second locking feature 136B, a third locking feature 136C, and/or a fourth locking feature 136D. The locking features engage the inner housing 106 and inhibit removal of the inner housing 106 from the cavity 122. In some example configurations, the first locking feature 136A and/or the second locking feature 136B may extend from the third sidewall 126C. The second locking feature 136B may be offset from the first locking feature 136A. The third locking feature 136C and/or the fourth locking feature 136D may extend from the fourth sidewall 126D. The fourth locking feature 136D may be offset from the third locking feature 136C. The connector body 102 is shown including four locking features, however the connector body 102 may include more or less than four locking features.

Lock Member

With reference to FIGS. 1 and 2, an example lock member 104 (i.e., an independent secondary lock (ISL)) is shown. In various implementations, the lock member 104 includes a first portion 140, a second portion 142, a first arm 144-1, a second arm 144-2, a plurality of protrusions 146, a plurality of apertures 148, and/or a plurality of nubs 150, among others. The second portion 142 may be coupled to the first portion 140. The first arm 144-1 and/or the second arm 144-2 may be coupled to the first portion 140. The plurality of protrusions 146 may extend from the first portion 140. In some examples, the first portion 140 defines the apertures 148. The first arm 144-1 and the second arm 144-2 may help facilitate the alignment of the lock member 104 in the cavity 122. For example, the first arm 144-1 and the second arm 144-2 may engage portions of the connector body 102 (e.g., the third sidewall 126C, the fourth sidewall 126D, etc.) to align the lock member 104 within the cavity 122.

In various implementations, the second portion 142 includes a main body portion 152A and a first tab portion 152B-1 and a second tab portion 152B-2. The main body portion 152A may extend from the first portion 140 in a first direction (e.g., parallel to the Y-axis) and may be received by the channel 134 of the connector body 102. The first tab portion 152B-1 may extend from the main body portion 152A in a second direction (e.g., parallel to the X-axis) that is transverse to (e.g., orthogonal) the first direction. The second tab portion 152B-2 may extend from the main body portion 152A in a third direction that is opposite the second direction.

In various implementations, the first tab portion 152B-1 and the second tab portion 152B-2 may be received by the channel 134 of the connector body 102. For example, the first tab portion 152B-1 and the second tab portion 152B-2 may be disposed under the lips 138 of the connector body 102 in the assembled configuration, such that the main body portion 152A inhibits movement (e.g., translation) of lock member 104 relative to the connector body 102 in the second direction, while the first tab portion 152B-1 and the second tab portion 152B-2 inhibit movement (e.g., translation) of lock member 104 relative to the connector body 102 in the first direction.

In various implementations, the protrusions 146 include various sizes and configurations and may extend from the first portion 140. In some example configurations, the protrusions 146 extend from the first portion 140 in a direction opposite the second portion 142. The protrusions 146 may help facilitate the alignment of the lock member 104 in the cavity 122. For example, the protrusions 146 may engage portions of the connector body 102 (e.g., the second sidewall 126B) and/or may be disposed in portions (e.g., voids, channels, etc.) defined by the connector body 102 to align the lock member 104 within the cavity 122.

In various implementations, the nubs 150 are disposed within the apertures 148. For example, a nub 150 may be disposed within each aperture 148. In the assembled configuration, the apertures 148 may receive portions of the terminal assemblies 110 (e.g., terminals). In various implementations, the lock member 104 inhibits removal of the terminal assemblies 110 from the cavity 122. For example, in the assembled configuration, the nubs 150 may engage a portion of the terminal assemblies 110 to inhibit removal thereof from the apertures 148

Inner Housing

Figure 4:
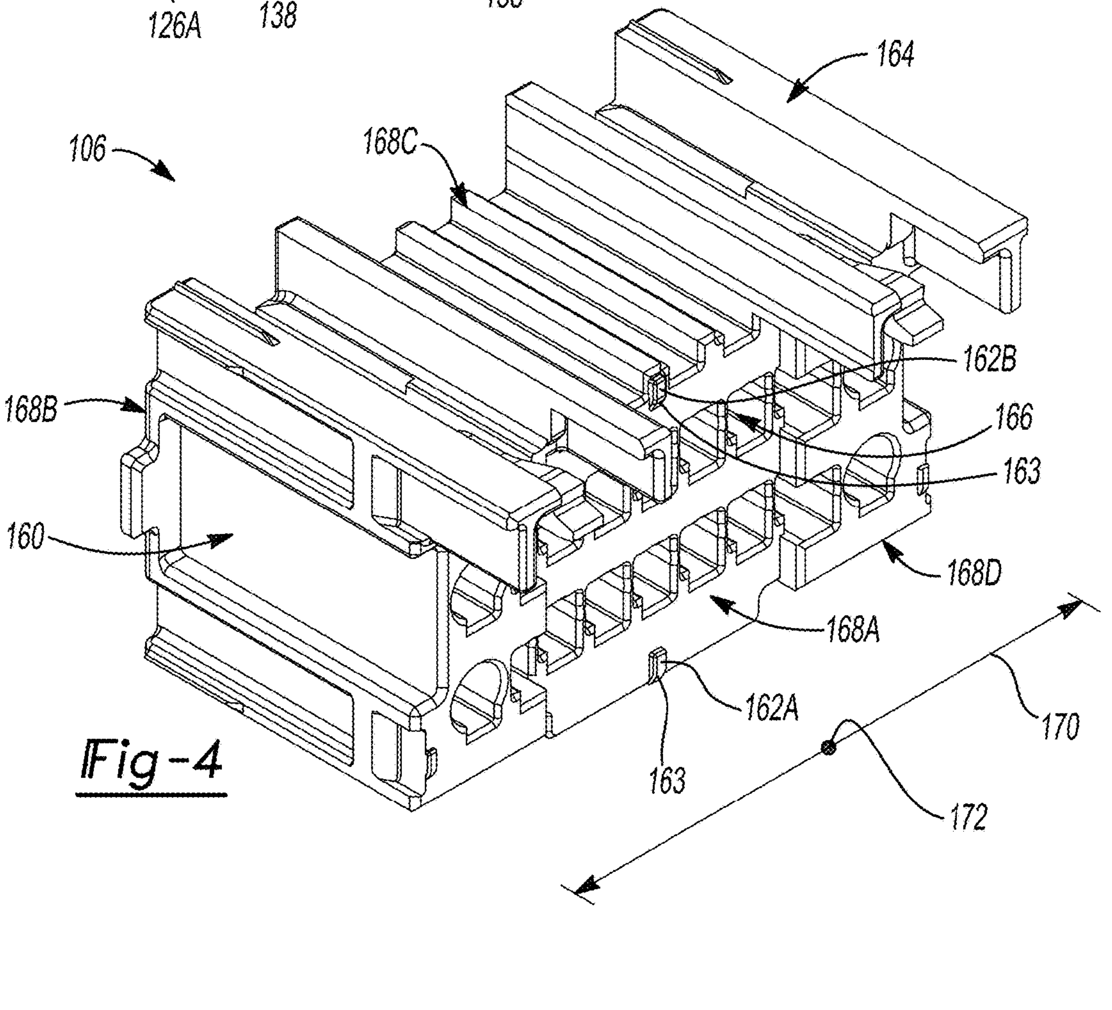
FIG. 4 is a perspective view of inner housing of a connector assembly in accordance with the principles of the present disclosure.

Referring now to FIG. 4, an example inner housing 106 is shown. In various implementations, the inner housing 106 may include a main body 160, a first detent 162A, a second detent 162B, a plurality of projections 164, and/or a plurality of slots 166 (i.e., apertures), among others. In some examples, the main body 160 may include a first side 168A, a second side 168B spaced apart from (e.g., opposite) the first side 168A, a third side 168C disposed between the first side 168A and the second side 168B, and a fourth side 168D spaced apart from (e.g., opposite) the third side 168C.

In various implementations, the first detent 162A and the second detent 162B engage portions of the lock member 104. In some example configurations, the first detent 162A may extend from the first side 168A and/or may be disposed proximate the third side 168C. The second detent 162B may extend from the first side 168A and/or may be disposed proximate the fourth side 168D. The second detent 162B may be offset from the first detent 162A. In various implementations, the first side 168A defines a length 170. In some example configurations, the first detent 162A and/or the second detent 162B may be disposed proximate a midpoint 172 of the length 170.

In various implementations, the first detent 162A and the second detent 162B may comprise one or more of a variety of shapes, sizes, and/or configurations. The first detent 162A and the second detent 162A may each include a ramp 163 (e.g., a ramped surface) extending from, and defining an obtuse angle relative to, the first side 168A of the inner housing 106. In various implementations, the ramp 163 detects unseated terminals. For example, the ramp 163 may engage the lock member 104 and push the lock member 104 (e.g., in the Z-direction) to detect the unseated terminals.

In various implementations, the ramp 163 accounts for manufacturing tolerances (e.g., in the Y-direction) associated with the connector body 102, the lock member 104, and/or the inner housing 106. For example, the ramp 163 pushes the lock member 104 (e.g., in the Z-direction) to engage unseated terminals regardless of the tolerance stack up of the connector body 102, the lock member 104, and/or the inner housing 106. The ramp 163 engages various sized and/or configured lock members. For example, the ramp 163 may engage different sized and/or configured lock members at different locations along the ramp. The inner housing 106 is shown and generally described herein as including two detents, however the inner housing 106 may include more or less than two detents.

In various implementations, the projections 164 may include various sizes and configurations and may extend from the main body 160. The projections 164 may help facilitate the alignment of the inner housing 106 in the cavity 122 of the connector body 102. For example, the projections 164 may be received by corresponding channels of the connector body 102. The projections 164 may engage portions of the connector body 102 (e.g., the second sidewall 126B) and/or may be disposed in portions (e.g., voids, channels, etc.) defined by the connector body 102 to align the inner housing 106 in the cavity 122.

In various implementations, the slots 166 receive portions of the terminal assemblies 110 (e.g., terminals). In various implementations, the inner housing 106 inhibits removal of the terminal assemblies 110 from the cavity 122.

Terminal Assemblies

Referring again to FIGS. 1 and 2, the terminal assembly 110 may include a terminal 180 and one or more electrical wires 182 coupled to the terminal 180. The electrical wires 182 may be electrically connected with an electrical device, an electrical component, a battery, and/or a power source associated with the vehicle. In various implementations, the terminal 180 may connect with a corresponding terminal of the mating connected. The connector assembly 100 is shown including one terminal assembly, however the connector assembly 100 may include more than one terminal assembly. As explained in more detail below, the terminals 180 may each include an end 186 configured to engage a locking arm 133 (e.g., the end 135) when the terminals 180 are in a properly seated configuration to secure the terminals 180 within the hole 132 (see, e.g., FIGS. 7 and 8).

Assembled Configuration

Figure 5:
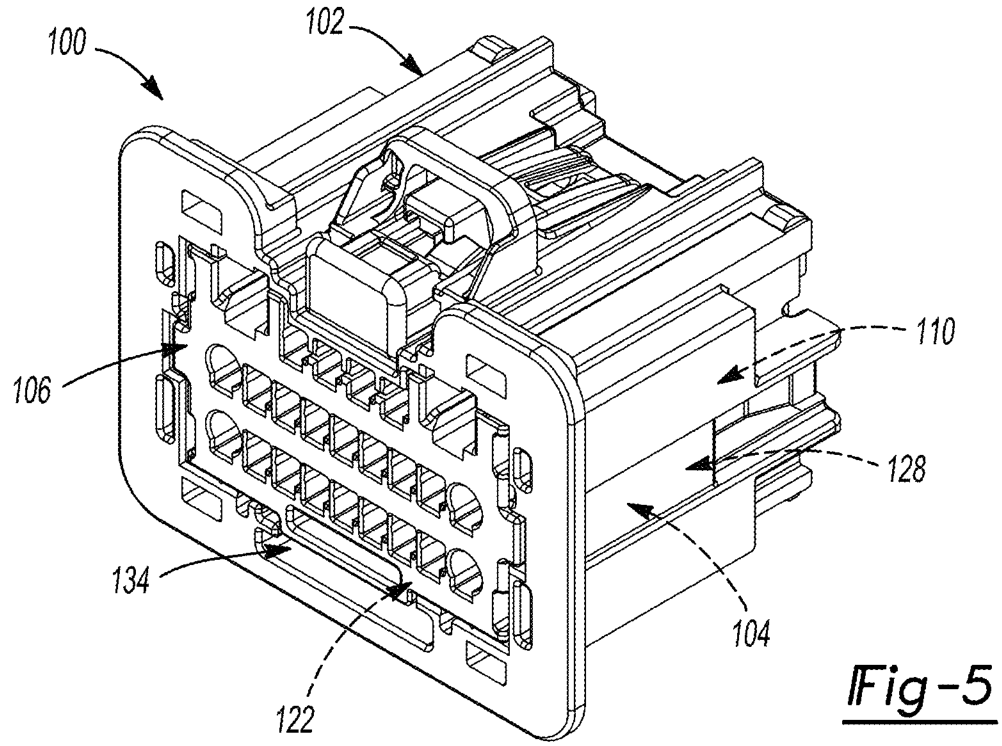
FIG. 5 is a perspective view of a connector assembly in an assembled configuration in accordance with the principles of the present disclosure.
Figure 6:
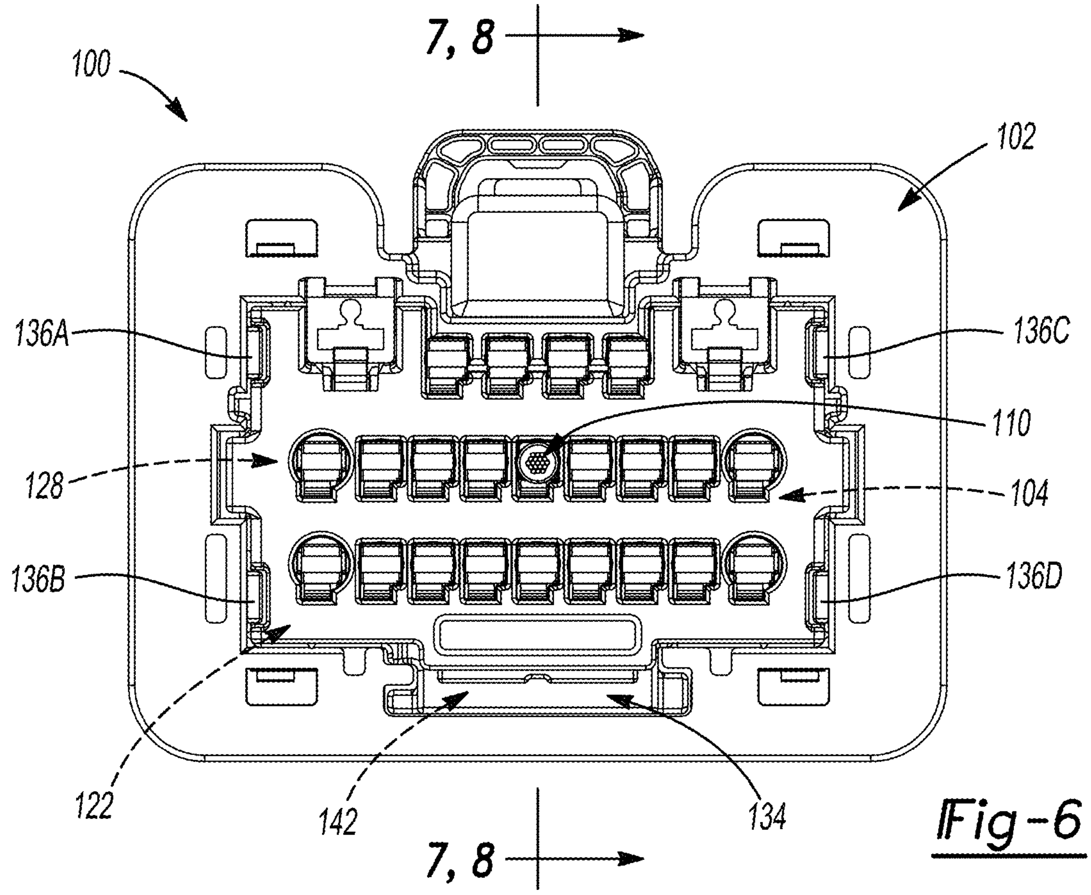
FIG. 6 is a front view of a connector assembly in an assembled configuration in accordance with the principles of the present disclosure.

With reference to FIGS. 5 and 6, the connector assembly 100 is shown in an assembled configuration. In the assembled configuration, the lock member 104, the inner housing 106, and/or portions of the terminal assemblies 110 are disposed in the cavity 122 of the connector body 102. In various implementations, the lock member 104 is disposed between the inner portion 128 of the connector body 102 and the inner housing 106.

In various implementations, the second portion 142 of the lock member 104 and a portion of the inner housing 106 are disposed in the channel 134 of the connector body 102. In various implementations, the inner housing 106 may be connected with the first locking feature 136A, the second locking feature 136B, the third locking feature 136C, and/or the fourth locking feature 136D to inhibit removal of the inner housing 106 and the lock member 104 from the cavity 122.

In various implementations, the lock member 104 and the inner housing 106 are positioned in the cavity 122 such that apertures 148 of the lock member 104, the slots 166 of the inner housing 106, and the holes 132 of the inner portion 128 are aligned. Each of the terminals 180 of the terminal assemblies 110 is disposed in a respective aperture 148, a respective slot 166, and a respective hole 132. Each of the terminals 180 may be engaged by (e.g., secured with) a respective locking arm 133 of the inner portion 128 of the connector body 102 to inhibit removal of the terminal from the cavity 122.

Flowchart

Figure 9:
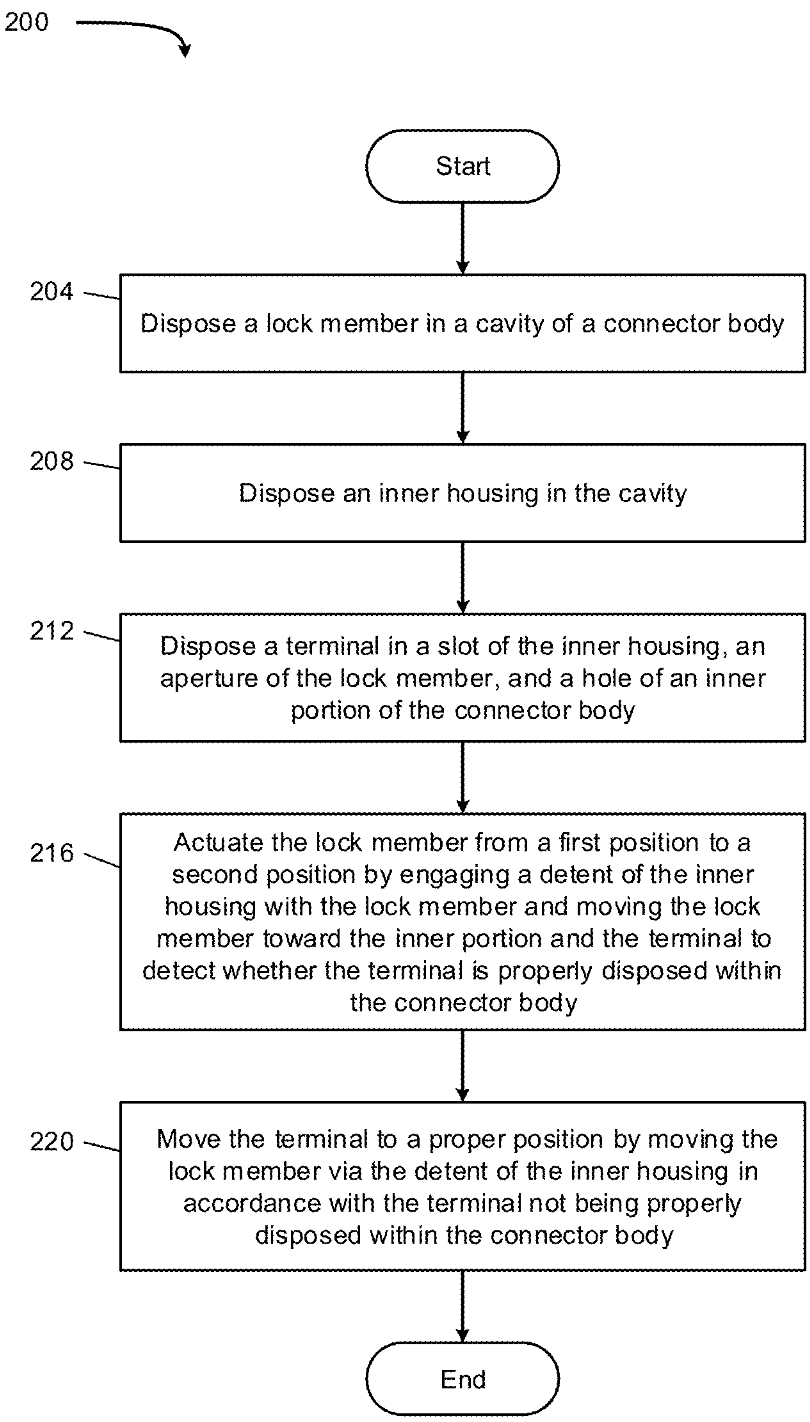
FIG. 9 is a flowchart depicting an example method for assembling a connector assembly in accordance with the principles of the present disclosure.

FIG. 9 is a flowchart of an example method 200 for assembling a connector assembly 100. The method 200 may begin at 204. At 204, a user or a machine (e.g., a robot, etc.) may dispose a lock member 104 in a cavity 122 of a connector body 102. In various implementations, disposing the lock member 104 in the cavity 122 may include inserting the lock member 104 into the cavity 122 in an insertion direction (e.g., Z-direction) and disposing a second portion 142 of the lock member 104 in a channel 134 of the connector body 102. The method 200 may proceed to 208.

At 208, the user or the machine may dispose an inner housing 106 in the cavity 122. In various implementations, disposing the inner housing 106 in the cavity 122 may include inserting the inner housing 106 into the cavity 122 in the insertion direction (e.g., Z-direction) and disposing a portion of the inner housing 106 in the channel 134 of the connector body 102. In various implementations, the lock member 104 and the inner housing 106 are disposed in the cavity 122 such that that apertures 148 of the lock member 104, slots 166 of the inner housing 106, and holes 132 of an inner portion 128 of the connector body 102 are aligned. The method 200 may proceed to 212.

At 212, the user or the machine may dispose (e.g., insert in the insertion direction) a terminal 180 of a terminal assembly 110 in a slot 166 of the inner housing 106, an aperture 148 of the lock member 104, and a hole 132 of the inner portion 128. The method 200 is generally shown and described herein as including one terminal assembly, however the method 200 may include more than one terminal assembly. The method 200 may proceed to 216.

At 216, the method 200 may include detecting whether the terminal 180 is properly disposed (e.g., seated) within the connector body 102. For example, the user or the machine may actuate the lock member 104 from a first position to a second position by engaging a detent (e.g., detent 162A) of the inner housing 106 with the lock member 104 and moving the lock member 104 toward the inner portion 128 and the terminal 180 (e.g., in the insertion direction) to detect whether the terminal 180 is properly disposed within the connector body 102.

Figure 8:
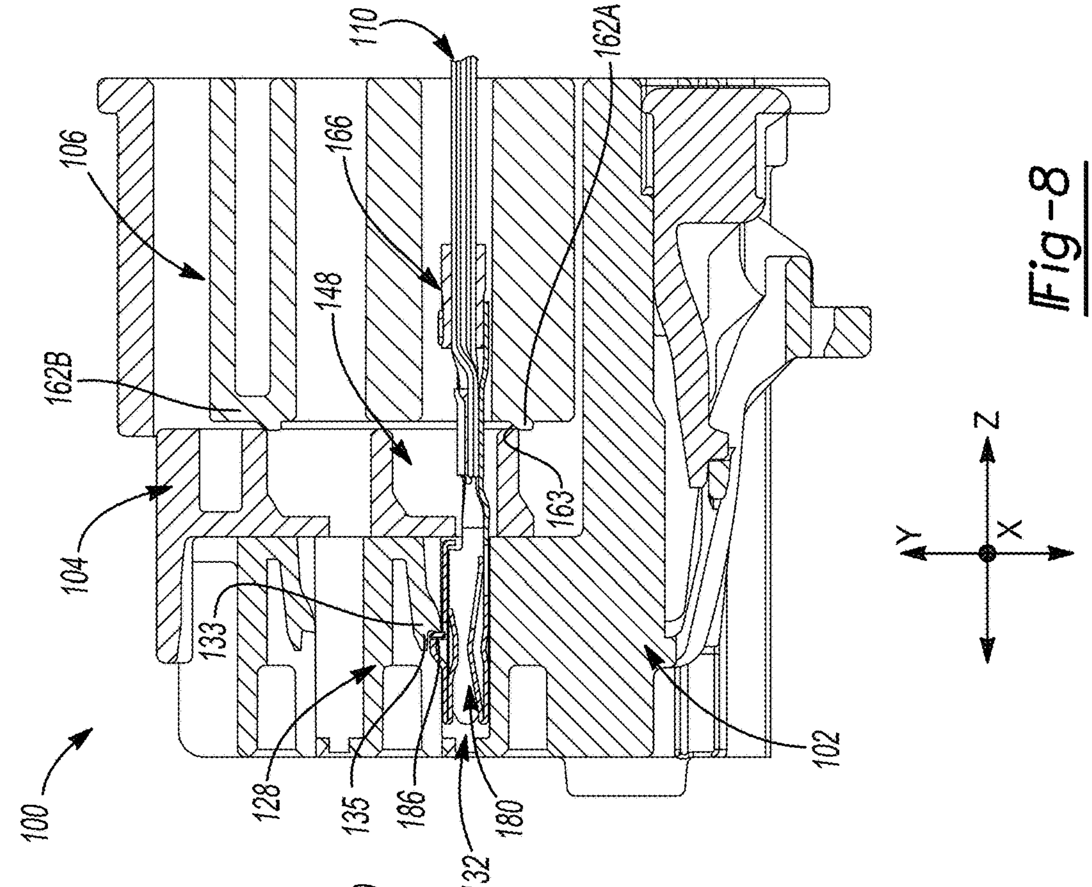
FIG. 8 is a cross-sectional view of a connector assembly in a second stage of assembly in accordance with the principles of the present disclosure.

In various implementations, in accordance with the terminal 180 being properly disposed within the connector body 102, the terminal 180 is engaged (e.g., locked) with a locking arm 133 of the inner portion 128 (see, e.g., FIG. 8). During actuation of the lock member 104 from the first position to the second position, the inner housing 106 is permitted to connect (e.g., lock) with locking features 136A-136D of the connector body 102 in accordance with the terminal 180 being properly disposed within the connector body 102.

Figure 7:
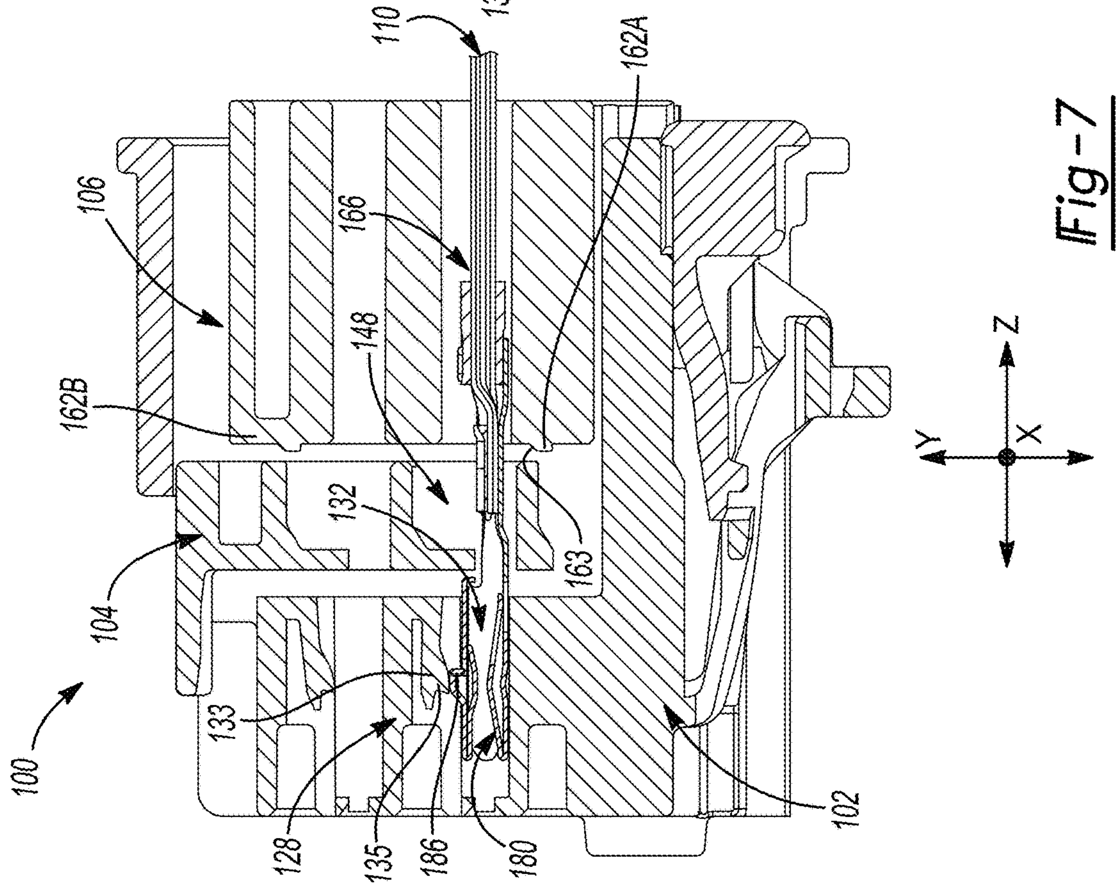
FIG. 7 is a cross-sectional view of a connector assembly in a first stage of assembly in accordance with the principles of the present disclosure.

In various implementations, in accordance with the terminal 180 not being properly disposed (e.g., unseated) within the connector body 102, the terminal 180 is not engaged (e.g., locked) with the locking arm 133 (see, e.g., FIG. 7). For example, the terminal 180 may not be properly engaged (i.e., secured) with the locking arm 133 and/or may be spaced apart from the locking arm 133 in a direction opposite the insertion direction. During actuation of the lock member 104 from the first position to the second position, the inner housing 106 is inhibited from connecting (e.g., locking) with the locking features 136A-136D of the connector body 102 in accordance with the terminal 180 not being properly disposed within the connector body 102. The method 200 may proceed to 220.

At 220, in accordance with the terminal 180 not being properly disposed (e.g., unseated) within the connector body 102, the user or machine may engage the lock member 104 with the terminal 180 and may move (e.g., in the insertion direction) the terminal 180 to a proper position (e.g., seated position) by moving the lock member 104 via the detent of the inner housing 106. In accordance with the terminal 180 being moved to the proper position (e.g., seated position), the inner housing 106 is permitted to connect (e.g., lock) with locking features 136A-136D of the connector body 102. Then the method 200 may end.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in a different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

Spatial and functional relationships between elements (for example, between modules, circuit elements, semiconductor layers, etc.) are described using various terms, including "connected," "engaged," "coupled," "adjacent," "next to,"

"on top of," "above," "below," and "disposed." Unless explicitly described as being "direct," when a relationship between first and second elements is described in the above disclosure, that relationship encompasses a direct relationship where no other intervening elements are present between the first and second elements as well as an indirect relationship where one or more intervening elements are present between the first and second elements. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "set" does not necessarily exclude the empty set-in other words, in some circumstances a "set" may have zero elements. The term "non-empty set" may be used to indicate exclusion of the empty set-in other words, a non-empty set will always have one or more elements. The term "subset" does not necessarily require a proper subset. In other words, a "subset" of a first set may be coextensive with (equal to) the first set. Further, the term "subset" does not necessarily exclude the empty set-in some circumstances a "subset" may have zero elements.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The following Clauses provide an exemplary configuration for a connector assembly and related methods, as described above.

Clause 1: A connector assembly comprising: a connector body including a plurality of walls and an inner portion, wherein: the plurality of walls define a cavity configured to receive a terminal, and the inner portion is disposed within the cavity; a lock member removably-disposed within the cavity and defining an aperture configured to receive the terminal; and an inner housing removably-disposed within the cavity and defining a slot configured to receive the terminal, the inner housing including a detent configured to engage the lock member, wherein: during actuation of the lock member from a first position to a second position, the detent engages the lock member and moves the lock member toward the inner portion and the terminal to detect whether the terminal is properly disposed within the connector body.

Clause 2: The connector assembly of clause 1, wherein, in accordance with the terminal not being properly disposed within the connector body, the lock member is configured to move the terminal to a proper position by the lock member being moved via the detent of the inner housing.

Clause 3: The connector assembly of clause 1 or 2, wherein: the connector body includes a locking feature that is configured to engage the inner housing and inhibit removal of the inner housing from the cavity; and the inner housing is inhibited from connecting with the locking feature when the terminal not properly disposed within the connector body.

Clause 4: The connector assembly of any of clauses 1 through 3, wherein: the inner portion of the connector body includes a locking arm configured to engage the terminal and inhibit removal of the terminal from the cavity; the terminal is secured by the locking arm when the terminal is properly disposed within the connector body; and the terminal is not secured by the locking arm when the terminal is not properly disposed within the connector body.

Clause 5: The connector assembly of any of clauses 1 through 4, wherein the detent includes a ramp.

Clause 6: The connector assembly of any of clauses 1 through 5, wherein: the detent extends from a side of the inner housing; the side defines a length; and the detent is disposed proximate a midpoint of the length.

Clause 7: The connector assembly of any of clauses 1 through 6, wherein the inner housing includes an additional detent offset from the detent.

Clause 8: The connector assembly of any of clauses 1 through 7, wherein: the inner housing includes a first side, a second side opposite the first side, and a third side disposed between the first side and the second side; the detent extends from the first side; and the detent is disposed proximate the third side.

Clause 9: The connector assembly of clause 8, wherein: the inner housing includes an additional detent and a fourth side opposite the third side; the additional detent extends from the first side; and the additional detent is disposed proximate the fourth side.

Clause 10: The connector assembly of any of clauses 1 through 9, wherein: the plurality of walls of the connector body include a sidewall defining a channel; and in an assembled configuration: portions of the lock member and the inner housing are disposed in the channel, a hole of the inner portion is aligned with the aperture of the lock member and the slot of the inner housing, and the terminal is disposed in the hole, the aperture, and the slot.

Clause 11: A connector assembly comprising: a connector body including a plurality of walls and an inner portion having a locking arm, wherein: the plurality of walls define a cavity configured to receive a terminal, and the inner portion is disposed within the cavity; a lock member removably-disposed within the cavity and defining an aperture configured to receive the terminal; and an inner housing removably-disposed within the cavity and defining a slot configured to receive the terminal, the inner housing including a detent configured to engage the lock member; wherein, during actuation of the lock member from a first position to a second position, the detent engages the lock member and moves the lock member toward the inner portion and the terminal to detect whether the terminal is secured by the locking arm.

Clause 12: The connector assembly of clause 11, wherein, in accordance with the terminal not being secured by the locking arm, the lock member is configured to move the terminal to connect with the locking arm by the lock member being moved via the detent of the inner housing.

Clause 13: The connector assembly of clause 11 or 12, wherein: the connector body includes a locking feature that is configured to connect with the inner housing and to inhibit removal of the inner housing from the cavity; and in accordance with the terminal not being properly disposed within the connector body, the inner housing is inhibited from connecting with the locking feature.

Clause 14: The connector assembly of any of clause 11 through 13, wherein: the inner portion of the connector body includes a wall defining a hole configured to receive the terminal; and the locking arm is disposed within the hole.

Clause 15: The connector assembly of any of clauses 11 through 14, wherein the detent includes a ramp.

Clause 16: The connector assembly of any of clauses claim 11 through 15, wherein: the detent extends from a side of the inner housing; the side defines a length; and the detent is disposed proximate a midpoint of the length.

Clause 17: The connector assembly of any of clauses 11 through 16, wherein the inner housing includes an additional detent offset from the detent.

Clause 18: The connector assembly of any of clauses 11 through 17, wherein: the inner housing includes a first side, a second side opposite the first side, and a third side disposed between the first side and the second side; the detent extends from the first side; and the detent is disposed proximate the third side.

Clause 19: The connector assembly of clause 18, wherein: the inner housing includes a fourth side opposite the third side and an additional detent; the additional detent extends from the first side; and the additional detent is disposed proximate the fourth side.

Clause 20: A method of assembling a connector assembly, the method comprising: disposing a lock member in a cavity of a connector body; disposing an inner housing in the cavity; disposing a terminal in a slot of the inner housing, an aperture of the lock member, and a hole of an inner portion of the connector body; actuating the lock member from a first position to a second position by engaging a detent of the inner housing with the lock member and moving the lock member toward the inner portion and the terminal to detect whether the terminal is properly disposed within the connector body; and in accordance with the terminal not being properly disposed within the connector body, moving the terminal to a proper position by moving the lock member via the detent of the inner housing.

What is claimed is:

1. A connector assembly comprising:

a connector body including a plurality of walls and an inner portion, wherein:

the plurality of walls define a cavity configured to receive a terminal, and the inner portion is disposed within the cavity;

a lock member removably-disposed within the cavity and defining an aperture configured to receive the terminal; and an inner housing removably-disposed within the cavity and defining a slot configured to receive the terminal, the inner housing including a detent configured to engage the lock member, wherein:

during actuation of the lock member from a first position to a second position, the detent engages the lock member and moves the lock member toward the inner portion and the terminal to detect whether the terminal is properly disposed within the connector body.

2. The connector assembly of claim 1 wherein, in accordance with the terminal not being properly disposed within the connector body, the lock member is configured to move the terminal to a proper position by the lock member being moved via the detent of the inner housing.

3. The connector assembly of claim 1 wherein:

the connector body includes a locking feature that is configured to engage the inner housing and inhibit removal of the inner housing from the cavity; and the inner housing is inhibited from connecting with the locking feature when the terminal not properly disposed within the connector body.

4. The connector assembly of claim 1 wherein:

the inner portion of the connector body includes a locking arm configured to engage the terminal and inhibit removal of the terminal from the cavity;

the terminal is secured by the locking arm when the terminal is properly disposed within the connector body; and the terminal is not secured by the locking arm when the terminal is not properly disposed within the connector body.

5. The connector assembly of claim 1 wherein the detent includes a ramp.

6. The connector assembly of claim 1 wherein:

the detent extends from a side of the inner housing;

the side defines a length; and the detent is disposed proximate a midpoint of the length.

7. The connector assembly of claim 1 wherein the inner housing includes an additional detent offset from the detent.

8. The connector assembly of claim 1 wherein:

the inner housing includes a first side, a second side opposite the first side, and a third side disposed between the first side and the second side;

the detent extends from the first side; and the detent is disposed proximate the third side.

9. The connector assembly of claim 8 wherein:

the inner housing includes an additional detent and a fourth side opposite the third side;

the additional detent extends from the first side; and the additional detent is disposed proximate the fourth side.

10. The connector assembly of claim 1 wherein:

the plurality of walls of the connector body include a sidewall defining a channel; and in an assembled configuration:

portions of the lock member and the inner housing are disposed in the channel, a hole of the inner portion is aligned with the aperture of the lock member and the slot of the inner housing, and the terminal is disposed in the hole, the aperture, and the slot.

11. A connector assembly comprising:

a connector body including a plurality of walls and an inner portion having a locking arm, wherein:

the plurality of walls define a cavity configured to receive a terminal, and the inner portion is disposed within the cavity;

a lock member removably-disposed within the cavity and defining an aperture configured to receive the terminal; and an inner housing removably-disposed within the cavity and defining a slot configured to receive the terminal, the inner housing including a detent configured to engage the lock member;

wherein, during actuation of the lock member from a first position to a second position, the detent engages the lock member and moves the lock member toward the inner portion and the terminal to detect whether the terminal is secured by the locking arm.

12. The connector assembly of claim 11 wherein, in accordance with the terminal not being secured by the locking arm, the lock member is configured to move the terminal to connect with the locking arm by the lock member being moved via the detent of the inner housing.

13. The connector assembly of claim 11 wherein:

the connector body includes a locking feature that is configured to connect with the inner housing and to inhibit removal of the inner housing from the cavity; and in accordance with the terminal not being properly disposed within the connector body, the inner housing is inhibited from connecting with the locking feature.

14. The connector assembly of claim 11 wherein:

the inner portion of the connector body includes a wall defining a hole configured to receive the terminal; and the locking arm is disposed within the hole.

15. The connector assembly of claim 11 wherein the detent includes a ramp.

16. The connector assembly of claim 11 wherein:

the detent extends from a side of the inner housing;

the side defines a length; and the detent is disposed proximate a midpoint of the length.

17. The connector assembly of claim 11 wherein the inner housing includes an additional detent offset from the detent.

18. The connector assembly of claim 11 wherein:

the inner housing includes a first side, a second side opposite the first side, and a third side disposed between the first side and the second side;

the detent extends from the first side; and the detent is disposed proximate the third side.

19. The connector assembly of claim 18 wherein:

the inner housing includes a fourth side opposite the third side and an additional detent;

the additional detent extends from the first side; and the additional detent is disposed proximate the fourth side.

20. A method of assembling a connector assembly, the method comprising:

disposing a lock member in a cavity of a connector body;

disposing an inner housing in the cavity;

disposing a terminal in a slot of the inner housing, an aperture of the lock member, and a hole of an inner portion of the connector body;

actuating the lock member from a first position to a second position by engaging a detent of the inner housing with the lock member and moving the lock member toward the inner portion and the terminal to detect whether the terminal is properly disposed within the connector body; and in accordance with the terminal not being properly disposed within the connector body, moving the terminal to a proper position by moving the lock member via the detent of the inner housing.

* * * * *